United States Patent

Tessier et al.

[11] Patent Number: 6,156,180
[45] Date of Patent: Dec. 5, 2000

[54] ELECTRODEIONIZATION APPARATUS HAVING GEOMETRIC ARRANGEMENT OF ION EXCHANGE MATERIAL

[75] Inventors: David Florian Tessier, Oakville, Canada; Joseph Denis Robert Toupin, Gif-sur-Yvette, France; Ian Glenn Towe, Alton, Canada

[73] Assignee: Glegg Water Conditioning, Inc., Guelph, Canada

[21] Appl. No.: 09/142,242

[22] PCT Filed: Jan. 13, 1997

[86] PCT No.: PCT/CA97/00018

§ 371 Date: Aug. 21, 1998

§ 102(e) Date: Aug. 21, 1998

[87] PCT Pub. No.: WO97/25147

PCT Pub. Date: Jul. 17, 1997

[30] Foreign Application Priority Data

Jan. 12, 1996 [GB] United Kingdom .................... 9600633

[51] Int. Cl.⁷ ..................................................... B01D 61/48
[52] U.S. Cl. ........................... 204/524; 204/533; 204/536; 204/632
[58] Field of Search ..................... 204/524, 533, 204/536, 632

[56] References Cited

U.S. PATENT DOCUMENTS 3,755,135  8/1973  Johnson .................................. 204/632
4,033,850  7/1977  Kedem et al. ......................... 204/632

FOREIGN PATENT DOCUMENTS 629790     10/1992  Australia .
0 680 932  11/1995  European Pat. Off. .
2292504    6/1976   France .
1048026    11/1966  United Kingdom .
WO 96 22162  7/1996  WIPO .

Primary Examiner—Arun S. Phasge
Attorney, Agent, or Firm—Arne I. Fors

[57] ABSTRACT

An electrodeionization apparatus adapted to remove ions from a liquid, the apparatus having a cathode proximate a first end of the apparatus and an anode proximate the opposite end of the apparatus and having a plurality of alternating diluting compartments and concentrating compartments positioned between the cathode and the anode, the diluting and concentrating compartments defined by anion and cation permeable membranes, and ion exchange material positioned within the diluting compartments, the diluting compartments having therein a continuous phase of a first ion exchange material containing a dispersed phase of clusters of a second ion exchange material. The method of removing ions from a liquid in such an electrodeionization apparatus comprises passing an aqueous liquid to be purified through the diluting compartments in which the diluting compartments have the continuous phase of a first ion exchange material with the dispersed phase of a second ion exchange material.

33 Claims, 3 Drawing Sheets

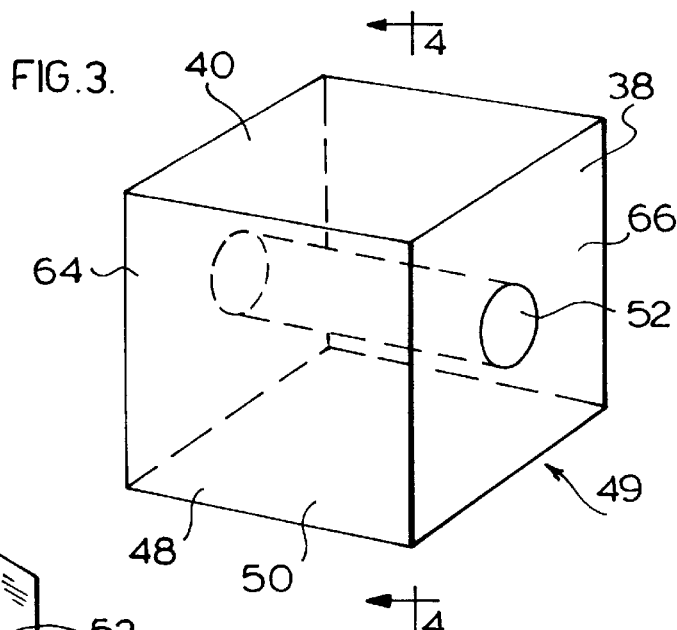
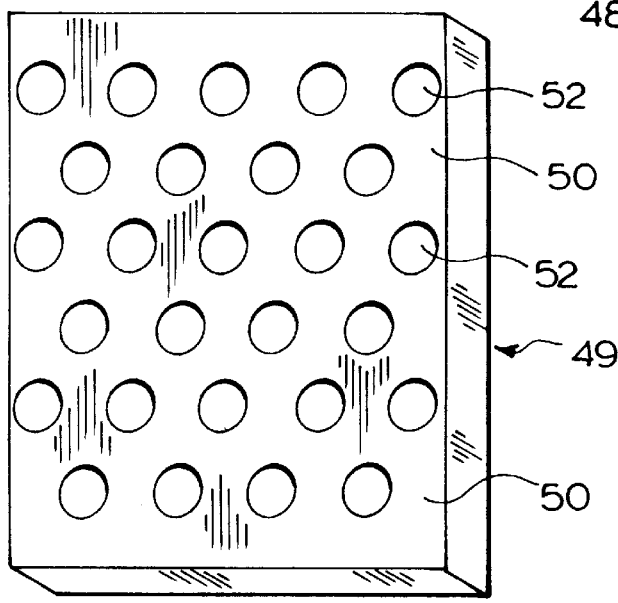
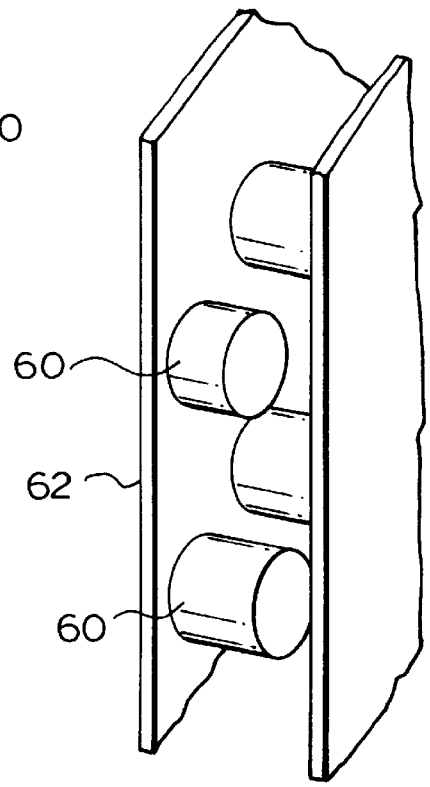

ELECTRODEIONIZATION APPARATUS HAVING GEOMETRIC ARRANGEMENT OF ION EXCHANGE MATERIAL

This application is a 371 of PCT/CA97/00018 filed Jan. 13, 1997.

FIELD OF INVENTION

This invention relates to an electrodeionization apparatus and a method of removing ions from an aqueous liquid in an electrodeionization apparatus and, more particularly, relates to an electrodeionization apparatus having a plurality of diluting compartments and concentrating compartments and a continuous phase of a first ion exchange material with a dispersed phase of a second ion exchange material, and a method of removing ions from an aqueous liquid in such an electrodeionization apparatus.

BACKGROUND OF THE INVENTION

The purification of liquid has become of great interest in many industries. In particular, pure water is used for many industrial purposes rather than merely as drinking water. For example, pure water is used in processes for producing semiconductor chips, in power plants, in the petrochemical industry and for many other purposes. Ion exchange resins, reverse osmosis filtration and electrodialysis techniques have been used to reduce the concentration of ions in a liquid.

Electrodeionization apparatus have recently been used with more frequency to reduce the concentration of ions in a liquid. The term "electrodeionization" generally refers to an apparatus and process for purifying liquids which combine ion exchange resins, ion exchange membranes and electricity to purify the liquids. An electrodeionization module comprises alternating arrangements of cation permeable membranes and anion permeable membranes defining compartments therebetween. In alternating compartments, there is provided ion exchange resin. Those compartments are known as diluting compartments.

The compartments which generally do not contain ion exchange resin are known as the concentrating compartments. Ions migrate from the diluting compartments through ion exchange resin and ion permeable membranes into the concentrating compartments by the introduction of current. The liquid flowing through the concentrating compartments is discarded or partially recycled and the purified liquid flowing through the diluting compartments is recovered as deionized liquid product.

U.S. Pat. No. 4,636,296 which issued Jan. 13, 1987 to Kunz discloses an apparatus and method for the demineralization of aqueous solutions. An aqueous liquid is passed through alternating separate layers of cation exchange resin and anion exchange resin. This approach is cumbersome, electrode intensive and some distortion of the layers will likely occur during service.

U.S. Pat. No. 5,308,467 which issued May 3, 1994 to Sugo et al. discloses an electrically regenerable demineralizing apparatus which has a demineralizing compartment. Ion exchange groups are disposed on monofilaments, woven fabric of monofilaments or nonwoven fabric of monofilaments by radiation-initiated graft polymerization. This ion exchange material is contained within the demineralizing compartment.

The use of such monofilaments in demineralizing apparatus is expensive and, therefore, has not been readily accepted by purchasers of liquid purification apparatus.

It is desirable to have an arrangement of ion exchange material in the diluting compartments of electrodeionization apparatus which does not use monofilaments and which allows various types of ion exchange material to be arranged in the diluting compartment in non-layer arrangement but still allowing the liquid to be purified to come into contact with discrete zones of two types of ion exchange material.

SUMMARY OF THE INVENTION

The disadvantages of the prior art may be overcome by providing an electrodeionization apparatus which has a continuous phase of a first ion exchange material containing therein a dispersed phase of clusters of a second ion exchange material in the diluting compartments, and a method of removing ions from an aqueous liquid in an electrodeionization apparatus having such arrangement of ion exchange materials in the diluting compartments. This arrangement allows an increase in the thickness and size thereby permitting more resin to be placed in the diluting compartments and decreasing the number of membrane areas required for a corresponding increase in flow.

In its broad aspect, the ion exchange material of the invention comprises a porous and permeable ion exchanger containing cation exchange resin particles and anion exchange resin particles for use in deionizing an aqueous liquid including a porous and permeable continuous phase of one of cation exchange resin particles or anion exchange resin particles and a porous and permeable dispersed phase of clusters of the other of the cation exchange resin particles or the anion exchange resin particles within the continuous phase. The ion exchanger preferably is in the form of a shallow bed having opposite planar bed surfaces in which the dispersed phase clusters are conterminous with at least one of the planar bed surfaces. The dispersed phase clusters may extend through the shallow or thick bed and be conterminous with the opposite planar bed surfaces of the bed. The clusters can be shallow cylinders or ellipses or transversely multi-faceted. The cation exchange resin particles and the anion exchange resin particles preferably are bound by a binder polymer to form a cohesive bed.

More particularly, the electrodeionization apparatus adapted to remove ions from an aqueous liquid includes a cathode in a cathode compartment and an anode in an anode compartment and a plurality of alternating diluting compartments and concentrating compartments positioned between the cathode and the anode, the diluting and concentrating compartments defined by anion and cation permeable membranes, and porous and permeable ion exchange material positioned within the diluting compartments, the porous and permeable ion exchange material comprising a porous and permeable continuous phase of one of cation exchange resin particles and anion exchange resin particles and a dispersed phase of clusters of the other of the cation exchange resin particles and the anion exchange resin particles within the continuous phase. The ion exchanger preferably is in the form of a shallow bed or sheet having opposite planar bed surfaces in which the dispersed phase clusters are conterminous with at least one of the planar bed surfaces. The dispersed phase clusters preferably extend through the shallow bed conterminous with the opposite planar bed surfaces of the bed. The clusters can be shallow or elongated cylinders or ellipses, or transversely multi-faceted such as elongated or shallow hexagons. The cation exchange resin particles and the anion exchange resin particles preferably are bound by a binder polymer to form a cohesive bed, said bed filling the diluting compartment.

In a further aspect of the invention, the dispersed phase clusters of cation or anion exchange resin particles are exposed with at least one end conterminous with a planar surface of the bed for contacting the anion permeable membrane or the cation permeable membrane of the same type, i.e., the clusters of cation exchange resin particles contact the cation permeable membrane, and the clusters of anion exchange resin particles contact the anion permeable membrane, and preferably the dispersed phase clusters extend through the continuous phase and are conterminous the opposite planar surfaces of the continuous phase bed for abutment and contact with both the anion permeable membrane and the cation permeable membrane, thereby bridging the diluting compartments.

In another aspect of the invention, the method of the invention for removing ions from an aqueous liquid in an electrodeionization apparatus compartment including an anode compartment having an anode and a cathode compartment having a cathode, and a plurality of cation exchange membranes and anion exchange membranes which are alternately arranged between the anode compartment and the cathode compartment to form demineralizing compartments each defined by an anion exchange membrane on the anode side and by a cation exchange membrane on the cathode side, and concentrating compartments each defined by a cation exchange membrane on the anode side and by an anion exchange membrane on the cathode side, comprises feeding the aqueous liquid to be purified through the diluting compartments in which the diluting compartments have a continuous phase of a first ion exchange material with a dispersed phase of clusters of a second ion exchange material, said clusters of said dispersed phase being conterminous with and abutting at least one of the anion and cation permeable membranes of the same sign, said clusters of the dispersed phase preferably extending through the continuous phase conterminous with and abutting both the anion and cation permeable members, flowing an electrical current between the cathode and the anode, and removing purified aqueous liquid from the apparatus.

A still further aspect of the invention comprises a method of producing a porous and permeable ion exchanger which comprises positioning a template having a planar cover plate with a plurality of shaped, thin-walled hollow elements having open top and bottom ends depending downwardly therefrom over a designated receiving area, and feeding an aqueous slurry of one of cation exchange resin particles or anion exchange resin particles to said template to form a continuous phase of said ion exchange resin particles, and feeding an aqueous slurry of the other of the cation exchange resin particles or anion exchange resin particles into the plurality of shaped, thin-walled hollow elements to form a plurality of dispersed phase clusters of the other of the cation exchange resin particles or the anion exchange resin particles.

Another aspect of the invention includes a method of producing a porous and permeable ion exchanger which comprises positioning an array of dispensing nozzles for selectively dispensing an aqueous slurry of cation exchange resin particles or anion exchange resin particles over a designated receiving area, and feeding to said designated area an aqueous slurry of one of the cation exchange resin particles or the anion exchange resin particles to form a continuous phase of said ion exchange resin particles, and feeding an aqueous slurry of the other of the cation exchange resin particles or anion exchange resin particles in a predetermined pattern to form a plurality of dispersed discontinuous phase clusters of the other of the cation exchange resin particles or the anion exchange resin particles. A further aspect of the invention comprises a method of producing a porous and permeable ion exchanger by die cutting a plurality of shaped clusters of cation exchange resin particles or anion exchange resin particles from a first sheet of said resin particles to form a continuous phase of said ion exchange resin particles having a plurality of holes therein, die cutting a plurality of identical clusters of the other of cation exchange resin particles or anion resin particles from a second sheet of said resin particles, and fitting said cut-out clusters of the other of the cation exchange resin particles or anion resin particles into the holes of the first sheet.

The ion exchanger can be formed over an ion exchange membrane for intimate contact of the dispersed phase of ion exchange particles with the membrane, in a spacer frame or jig, and the ion exchanger frozen in the spacer frame or jig for transfer.

The invention also includes the step of inserting a shaped mesh preform having a mesh size smaller than the average particles size into the hollow elements for incorporation into the discrete discontinuous phase clusters or in the continuous phase of the ion exchange resin particles.

The shaped preform can have a right cylinder, or right rectangle, right hexagonal or right multi-faceted prismatic shape.

A honeycomb mesh can be incorporated in one of the dispersed phase clusters or the continuous phase.

BRIEF DESCRIPTION OF THE DRAWINGS

The present invention will now be described with reference to the accompanying drawings, in which:

FIG. 3 is a perspective view of the arrangement of ion exchange material of the invention;

FIG. 4 is a cross-sectional view taken along line 4—4 of FIG. 3; and

FIG. 5 is a perspective view of another arrangement of ion exchange material of the invention;

DETAILED DESCRIPTION OF THE PREFERRED EMBODIMENT

Figure 1:
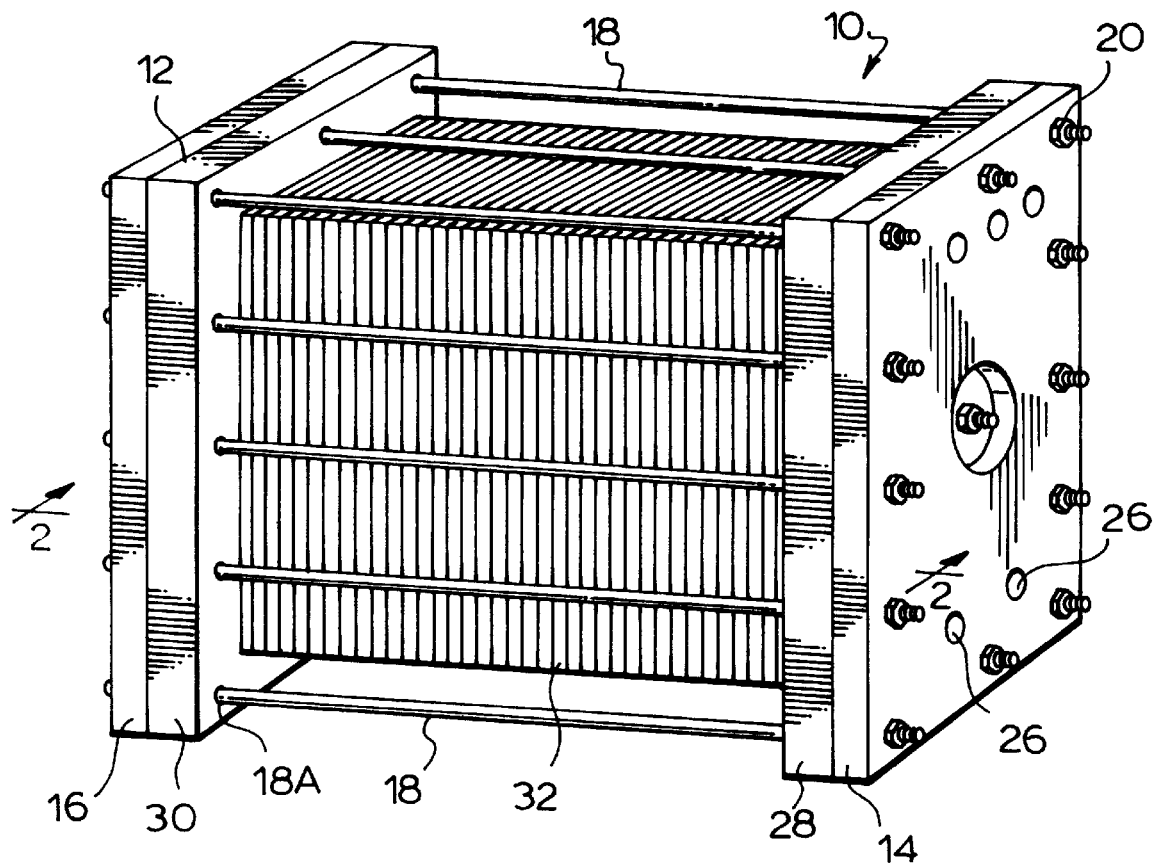
FIG. 1 is a perspective view of a prior art electrodeionization apparatus.

Referring to FIG. 1, a prior art electrodeionization apparatus 10 is shown whereby ions may be removed from a liquid. In the preferred embodiment, ions such as sodium ion and chloride ion are removed from water.

The electrodeionization apparatus 10 has a rectangular frame 12. The frame 12 comprises a rigid front plate 14 and a rigid back plate 16 formed of metal. The front plate 14 and the back plate 16 are joined together by a number of tie-bars or bolts 18. Each tie-bar 18 is inserted into a hole 20 located equispaced about the periphery of the front plate 14 and inserted into corresponding holes 18a in back plate 16. A cathode depicted by numeral 22 (FIG. 2) is located proximate the front plate 14 in a cathode compartment 23 and an anode depicted by numeral 24 is located proximate the back plate 16 in an anode compartment 25. Openings 26 are located by the front plate 14 to allow liquid to enter the electrodeionization apparatus 10 for treatment. Insulating electrode block 28 forming an electrode compartment abuts the perimeter of the front plate 14 and insulating electrode block 30 forming an electrode compartment continuously abuts the perimeter of the back plate 20. The electrodeionization apparatus 10 has a plurality of alternating cation permeable membranes and anion permeable membranes depicted by numeral 32 between the insulating electrode blocks 28 and 30. The cation permeable membranes and anion permeable membranes 32 define alternating concentrating and diluting compartments, to be described.

Figure 2:
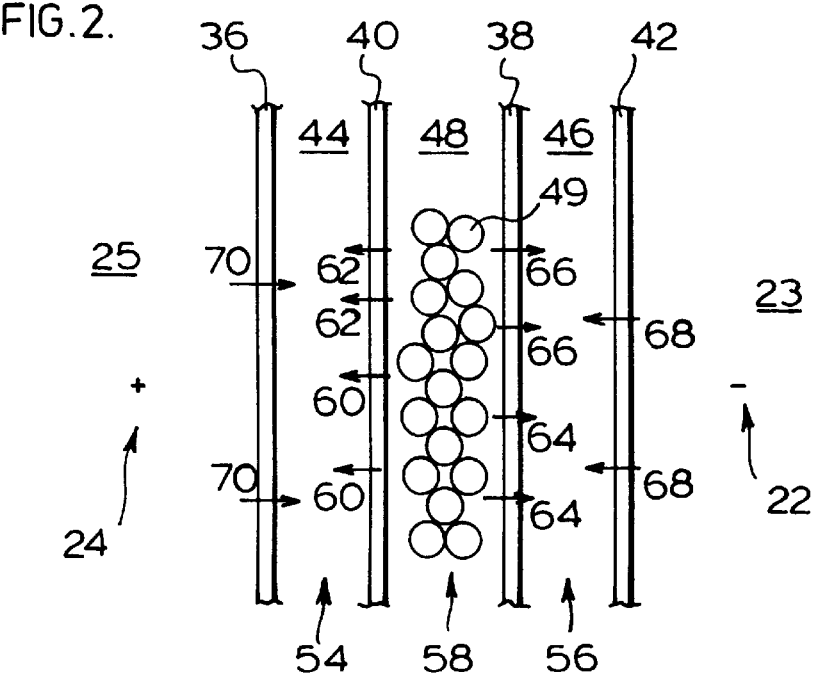
FIG. 2 is a fragmentary sectional view taken along line 2—2 of FIG. 1.

FIG. 2 shows representative concentrating compartments 44, 46 and a representative diluting compartment 48, between the concentrating compartments, in further detail. Cation permeable membranes 36 and 38 and anion permeable membranes 40 and 42 define the concentrating compartments and diluting compartments. Spacers (not shown) are placed between the membranes in the diluting compartments and concentrating compartments. The spacers in the diluting compartments 48 have openings for placement of ion exchange material such as ion exchange resin beads 49. It will be understood that ion exchange resin may also be placed within the concentrating compartments.

FIGS. 3 and 4 show a preferred arrangement of ion exchange material of the present invention to be used within the diluting compartment 48 shown in FIG. 2. A bed 40 of porous and permeable continuous phase, i.e. matrix, of ion exchange material 50 has a plurality of spaced-apart cylinders of porous and permeable clusters of second ion exchange material 52, one of which is shown in FIG. 3, dispersed within matrix 50 transversely of the bed plane. The ion exchange materials 50 and 52 preferably are ion exchange resin particles in the form of beads. The ion exchange material 50 and ion exchange material 52 exchange oppositely charged ions. For example, if continuous phase ion exchange material 50 is a cation exchange material, which will have fixed negative charges to capture cations, dispersed phase ion exchange material 52 is an anion exchange material which will have fixed positive charges to capture anions. The transverse arrangement of clusters of the dispersed phased ion exchange material straddling or bridging the diluting compartments ensures that the aqueous liquid which flows within the diluting compartments 48 comes into contact with both forms of ion exchange resins to effectively exchange cations and anions.

Referring to FIGS. 1, 2, 3 and 4, aqueous liquid to be treated flows through the openings 26 and through the concentrating compartments 44 and 46 and the diluting compartment 48. Streams of liquid depicted by arrows 54 and 56 flow through the concentrating compartments 44 and 46 respectively and a stream of liquid depicted by arrow 58 flows through the diluting compartment 48. The aqueous liquid contains ions such as sodium and chloride ions.

Electric current flows between the cathode 22 in cathode compartment 23 and the anode 24 in anode compartment 25. The current across cathode 22 and anode 24 may be varied to control the overall efficiency of the electrodeionization process.

As the liquid to be purified flows through the diluting compartment 48 as depicted by arrow 58, it comes into contact with ion exchange resin beads, as in the arrangement shown in FIGS. 3 and 4. Cation exchange resin 50 has fixed negative charges and captures cations such as sodium ions present in the liquid. Anion exchange resin 52 has fixed positive charges and captures anions such as chloride ions present in the liquid. As the ion exchange takes place between the liquid to be purified and the cation exchange resin beads 50 and the anion exchange resin beads 52, the voltage induces the non-desired cations and anions typified by sodium ions and chloride ions respectively to travel through membranes 38 and 40 and into the adjacent concentrating compartments 46 and 44. The ion exchange resin is disposed in a transverse arrangement relative to the flow of liquid as shown in FIGS. 3 and 4. This arrangement ensures that most of the liquid flowing through the diluting compartment 48 comes into contact with ion exchange material 50 and 52.

In the preferred embodiment, water is purified in the electrodeionization apparatus 10. The current induces some splitting of water into hydrogen and hydroxyl ions. The hydrogen ions are transported through the cation exchange resin 50 towards the cation exchange membrane 38, and through cation exchange membrane 38 into the concentrating compartment 46, as shown by arrows 66. The hydroxyl ions are transported through the anion exchange resin 52, towards anion permeable membrane 40, and through anion permeable membrane 40 into the concentrating compartment 44, as shown by arrows 62. Thus, the ion exchange resin material 50 and ion exchange resin material 52 are continuously regenerated.

Anionic impurities, for example chloride ions in the water to be purified in diluting chamber 48, are taken up by the anion exchange resin material 52, by the usual ion exchange mechanism, and are then transported along with hydroxyl ions through the anion exchange resin up to, and through anion permeable membrane 40, into concentrating compartment 44 as shown by arrows 60. At the same time, an equivalent amount of hydrogen ions and impurity cations is transported from an adjacent diluting compartment into concentrating chamber 44, as shown by arrows 70.

Cationic impurities, for example sodium ions, in the water to be purified in diluting chamber 48 are taken up by the cation exchange resin material 50, by the usual ion exchange mechanism, and are then transported along with the hydrogen ions through the cation exchange resin up to, and through cation permeable membrane 38, into concentrating compartment 46 as shown by arrows 64. At the same time, an equivalent amount of hydroxyl ions and impurity anions is transported from an adjacent diluting compartment into concentrating chamber 46, as shown by arrows 68.

The water flows through the concentrating compartments 44 and 46 to a waste tank (not shown) or is recycled. The purified water flowing through the diluting compartment 48 is recovered as product.

It is understood that the dispersed ion exchange cluster material 52 may be of any geometric shape within the ion exchange matrix material 50, e.g. cylindrical, conical, frusto-conical or elliptical in cross-section, or multi-faceted in cross-section such as hexagonal right prismatic, to increase the surface area of the clusters.

FIG. 5 shows another embodiment of the arrangement of ion exchange resin material 50 and 52 of the present invention within the diluting compartments of an electrodeionization apparatus in which the dispersed cluster phase 60 in cylindrical form is aligned transversely within the diluting compartment and is continuous with and contacts an ion permeable membrane of the same charge, i.e. the same sign. For example, an anion exchange resin cluster 60 would be contiguous with and contact an anion permeable membrane 62. Preferably, the ion exchange clusters or islands extend through the continuous phase and are conterminous with the opposite faces 64, 66 of the bed 49, as typified in FIG. 3, whereby the dispersed clusters are contiguous with and will abut and contact both the anion permeable membrane and the cation permeable membrane.

The cluster 50 may be formed from a shallow bed or sheet of a continuous phase of ion exchange resin particles of a first or second ion exchange material, bonded by a polymeric binder, by die cutting clusters of the desired size and shape from the sheet.

A sheet of a continuous phase of ion exchange resin particles of an ion exchange material having an opposite charge bonded by a polymeric resin having a plurality of holes corresponding in size and shape to the clusters 50 die cut therefrom, can receive the cut-out clusters 50 having the opposite charge in tight-fitting frictional engagement to form the ion exchangers. A thermoplastic polymeric binder such as a low density polyethylene, linear low density polyethylene, or the like, in an amount sufficient to form a cohesive sheet or bed structure suitable for handling, while retaining good porosity, liquid permeability and ion exchange capacity, can be used to form the starting sheets of the first and second ion exchange material.

The porous and permeable ion exchangers can be formed in situ in the diluting compartments by the use of an array of dispensing nozzles to accurately and efficiently deliver metered amounts of a first ion exchange material and amounts of a second ion exchange material, as slurries, to a diluting chamber frame or template to form the required patterned configuration of a continuous phase of a first ion exchange material with a discontinuous phase of a second ion exchange material. The desired number of individual dispersed domains, e.g., cylindrical clusters of the second ion exchange material, can be formed directly. Individual dispersed domains of the second ion exchange material of various shapes, such as cylindrical or hexagonal right prismatic, conical, frusto-conical, and the like, can be formed by varying the number, shape and position of the dispensing nozzles and by varying the rate of delivery of the second ion exchange material in coordination with the delivery of the continuous phase of the first ion exchange material. The continuous phase of the first ion exchange material can readily be formed with the use of a plurality of dispensing nozzles by varying the number, size and geometric arrangement of these metering nozzles, the relative amounts of ion exchange materials delivered by the respective nozzles, and by the relative rate of delivery. The metering of ion exchange materials can be achieved by a number of means, including the use of screw feeders, displacement feeders, gravity, and the like. The array of nozzles provides the desired pattern of ion exchange materials; however, it may consist of a subset thereof, the entire desired pattern being built up by changing the relative positions of the assembly of dispensing nozzles and the diluting chamber frame or template.

Figure 6:
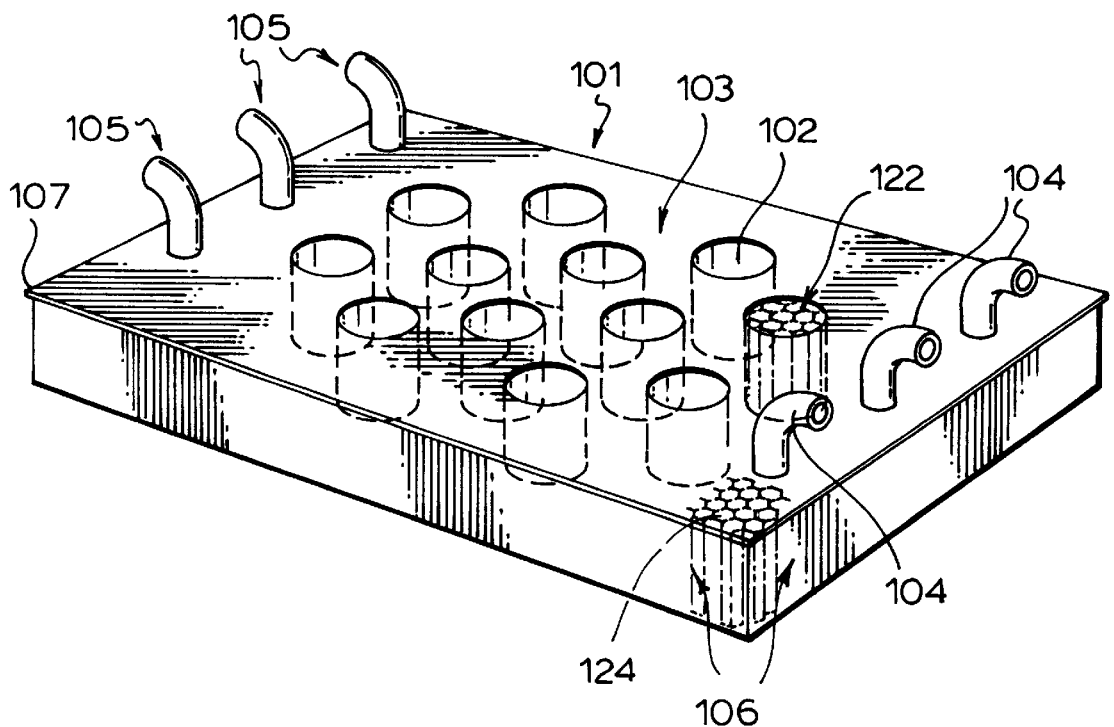
FIG. 6 is a perspective view of an apparatus for forming the ion exchanger of the invention.
Figure 7:
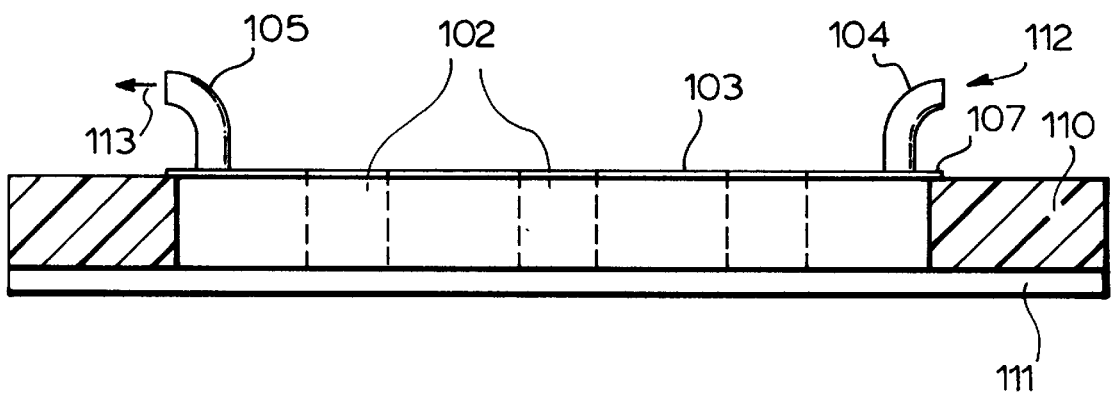
FIG. 7 is a side elevation of the apparatus shown in FIG. 6 mounted in a compartment spacer frame.

A patterned template can be used to accurately and efficiently deliver the desired amounts of a first ion exchange material and of a second ion exchange material, as slurries, to form the required patterned configuration of a continuous phase of a first ion exchange material with a discontinuous phase of a second ion exchange material. An example of such a template for cylindrical domains is shown in FIGS. 6 and 7. Template 101, corresponding to the desired pattern, comprises a plurality of shaped, thin-walled, hollow, open-ended elements 102 such as hollow cylinders defining the perimeter of the desired isolated domains of the second ion exchange material depending downwardly from a planar cover plate 103. Cover 103 defines the desired area of the continuous phase of the first ion exchange material. Feed tubes 104 for introducing the first ion exchange material in the form of a slurry of the ion exchange material suspended in water and discharge tubes 105 for removing excess water or other fluid used in transporting the first ion exchange material, project upwardly from cover plate 103. A perimeter wall 106 may, if desired, extend downwardly around the edge of template 101 and a peripheral flange 107 may extend outwardly from the edge of the template coplanar with cover plate 103. In use, the template is placed within a diluting compartment spacer frame 110 (FIG. 7) with wall 106 seated on and in contact with an ion exchange membrane 111. The first ion exchange material is sluiced into the template via feed tubes 104 and discharge tubes 105, as indicated by arrows 112 and 113, thereby providing the desired continuous phase of the first ion exchange material. An aqueous slurry of the second ion exchange material can be flooded onto the cover plate 103 to fill the tubes 102 with the second ion exchange material, excess ion exchange material being removed by means of a wiper by wiping off the excess second ion exchange material flush with the cover plate 103 or by flooding the cover plate 103 with water to rinse off excess solid material. Cover plate 103 may in turn have a cover, not shown, spaced therefrom to form a shallow passage coextensive with the width and length of cover plate 103 to direct the aqueous slurry uniformly across the cover plate 103 and avoid channelling for uniform deposition of the second ion exchange material in the domain tubes 102. The rate of filling of the tubes to form the discontinuous phase domains can be controlled by varying the slurry flow rate and the slurry density.

The template 101 is then removed from the spacer frame 110, leaving the desired pattern of continuous phase of first ion exchange material with discontinuous dispersed phase of clusters of second ion exchange material within the spacer frame.

The outwardly extending peripheral flange 107, seats on the upper surface of spacer frame 110, thereby obviating the need for perimeter wall 106 to seat on ion exchange membrane 111 if preferred.

This procedure also can be carried out with the use of a working jig, not shown, in lieu of the diluting spacer frame 110. A jig frame seated on a plastic film, with an embodiment of cover plate 103 seated thereon, can receive continuous and discontinuous phases of ion exchange particulate material having opposite charges by sluicing or flooding slurries of the ion exchange material into the respective cavities, as shown in FIGS. 6 and 7. Alternatively, a plurality of dispensing nozzles can be used to form a desired patterned configuration of continuous and discontinuous phases in a jig. The bed comprised of the continuous and discontinuous phases can be transported to a site for packing into a diluting compartment.

The fabrication methods can be used to achieve patterns with differently shaped domains by altering the template accordingly. The present fabrication methods can also be applied to making other patterns and configurations in which neither phase of material is continuous.

The required configuration of a continuous phase consisting of a first ion exchange material with a discontinuous phase of a second ion exchange material can be stabilized by means of a fine mesh defining the respective continuous and discontinuous regions. The openings in the mesh permit the flow of the water to be treated. The openings in the mesh are somewhat smaller than the ion exchange beads to be separated. Preferably, the relative sizes of the mesh openings and the ion exchange beads is such that in the compacted state obtained in a diluting chamber, the ion exchange beads on either side of the mesh come into contact with each other. Deionization can also be obtained with finer mesh where the ion exchange beads on either side of the mesh are in close proximity, up to a few bead diameters, but do not touch.

Cylindrical preforms or thimbles of mesh can be placed inside the patterned template described above in the area of the patterned template corresponding to the discontinuous phase. Following sluicing of the two resins and removal of the template, the cylindrical mesh elements remain embedded in the resulting pattern of ion exchange material. A single preform or multiple preforms also can be placed in the area of the patterned template corresponding to the continuous phase.

The ion exchange beads can be added selectively in a pattern by means of dispensing nozzles as described above, the single preform or multiple preforms occupying either or both of the continuous and discontinuous phases.

The fine mesh can be provided as individual preform cells or multiple interconnected preform cells having a right circle, or right rectangle, hexagonal or the like right prismatic shape with individual cells having a diameter or width of, for example, about 0.5 cm to fit into a discrete cylindrical domains having a diameter of about 3 cm. A plurality of interconnected mesh cells having a honeycomb configuration 122 forming a generally cylindrical domain 3 cm in diameter with individual cells of 0.5 cm width filling the domains effectively constrains the ion exchange material within the domain becoming embedded in the domain, and facilitates introduction of the ion exchange material by means of dispensing nozzles.

An elongated fine-mesh honeycomb slab 124 having dimensions to fill the compartment can be used for either or both the continuous and discontinuous phases to receive and stabilize the resin material from nozzles.

Fine-mesh honeycomb preforms can be formed by cutting to a desired shape and fitted into cylindrical holes in a patterned template and/or such preforms can be inserted into and comprise an integral part of the continuous phase of the template.

The required configuration of a continuous phase consisting of a first ion exchange material with a discontinuous phase of a second ion exchange material can be produced in a jig and frozen while wetted with water for convenient handling during stack assembly in the frozen state. The required configuration also can be produced in a jig with an ion exchange membrane and/or with a concentrating or diluting spacer frame to yield a sub-assembly which can be conveniently handled during stack assembly in the frozen state. Once assembled, the stack is allowed to thaw yielding the desired patterned ion exchange materials, constrained and stabilized in the diluting chambers.

It will be understood that these methods also can be used for forming patterned ion exchange materials in concentrating and electrode spacer frames, as well as in non-electrochemical ion exchange devices.

The method and apparatus of the invention will now be described with reference to the following non-limitative example.

EXAMPLE 1

Exemplary Comparative Behaviour of Patterned Ion Exchange Medium v. Mixed Bed ion Exchange Medium Comparative experiments were conducted using an electrodeionization apparatus with three diluting compartments. The apparatus consisted sequentially of: a 1.8 cm thick stainless steel end plate; a 2.5 cm thick PVC insulating electrode block; a platinum coated titanium anode; and approximately 0.1 cm thick electrode compartment spacer consisting of polypropylene mesh in an elastomeric frame, which frame served to seal the unit and to define fluid distribution ducts; an approximately 0.07 cm thick cation permeable membrane; an approximately 0.1 cm thick concentrating compartment spacer consisting of polypropylene mesh in an elastomeric frame, which frame served to seal the unit and to define fluid distribution ducts; three diluting/concentrating pairs in series each comprised of an approximately 0.07 cm thick anion permeable membrane, an 0.8 cm thick diluting compartment consisting of an open polypropylene frame for sealing and fluid distribution and for containing the ion exchange material to be evaluated, a fluid distributor and a fluid collector equipped with strainer slots to retain ion exchange beads in the diluting compartment, a 0.07 cm thick cation permeable membrane, and an approximately 0.1 cm thick concentrating compartment spacer; an approximately 0.07 cm thick cation permeable membrane, an approximately 0.1 cm thick electrode compartment spacer, a stainless steel cathode, a 2.5 cm thick PVC insulating electrode block, and a 1.8 cm thick stainless steel end plate. The dimensions of the working area of the fluid compartments (electrode concentrating and diluting) and the electrodes were 13 cm wide and 39 cm long in the direction of fluid flow. The components of the electrodeionization stack were held together in compression by 16×1.0 cm diameter threaded tie rods positioned in holes around the perimeter of the stainless steel end plates.

In the usual manner, the apparatus was provided with fluid ducts, defined by openings, in the spacers and membranes, for the following purposes: to feed water to be purified to the diluting compartments; to remove purified water from the diluting compartments; to feed water to the concentrating and electrode compartments; to remove water from the concentrating compartments; and to remove water from the electrode compartments. The water to be purified in the experiments consisted of municipal drinking water which had been first filtered with activated carbon, softened with a sodium cation exchange unit, partially deionized by reverse osmosis, and stored in a 800 gal polypropylene storage tank. This yielded feed water with a conductivity of approximately 3 $\mu$S/cm. The concentrating and electrode compartments were fed with filtered and softened water having a conductivity of about 350 $\mu$S/cm.

A first experiment was conducted in which the three diluting compartments were each filled with approximately 270 g of a bound intimate mixture, 50/50 by volume of dry Diaion strong acid and strong base ion exchange resin, in the sodium and chloride forms. The electrodeionization stack was then regenerated by passing water to be purified at flow rate of about 0.8 gpm through the diluting compartments, passing water through the concentrating and electrode compartments at a flow rate of about 0.2 gpm, and applying a current of about 1 Amp. The flow rate to the diluting compartments was increased to a target of about 1.3 gpm, the current was increase to 2.0 Amps, and the feed conductivity was 3.09 $\mu$S/cm. Under these conditions the steady-state product water resistivity was found to be 11.2 M$\Omega$cm.

A second experiment was conducted in which the three diluting compartments were each filled with a patterned bound arrangement of dry Diaion strong acid and strong base ion exchange resin, in the sodium and chloride forms. The pattern used consisted of a first continuous phase of about 147 g of dry bound anion exchange resin containing 72×1.9 cm cylindrical domains of second dispersed phase of about 123 g of bound cation exchange resin. The electrodeionization stack was first regenerated by passing water to be purified at a flow rate of about 0.3 gpm through the diluting compartments, passing water through the concentrating and electrode compartments at a flow rate of about 0.1 gpm and applying a current of about 1 Amp. The flow rate to the diluting compartments was increased to the target of about 1.3 gpm, the current was increased to 2.0 Amps, and the feed conductivity was 2.74 $\mu$S/cm. Under these conditions the steady-state product water resistivity was found to be 17.88 M$\Omega$cm.

It will be understood, of course, that modifications can be made in the embodiments of the invention described herein without departing from the scope and purview of the invention as defined by the appended claims.

We claim:

1. A porous and permeable ion exchanger containing cation exchange resin particles and anion exchange resin particles for use in deionizing a aqueous liquid comprising a porous and permeable continuous phase of one of cation exchange resin particles or anion exchange resin particles and a porous and permeable dispersed phase of clusters of the other of the cation exchange resin particles or the anion exchange resin particles in the continuous phase, in which the ion exchanger is in the form of a shallow bed having opposite planar bed surfaces, and in which said dispersed phase clusters are conterminous with at least one of said planar bed surfaces.

2. An ion exchanger as claimed in claim 1 in which dispersed phase clusters extend through the shallow bed and are conterminous with the opposite planar bed surfaces of the bed.

3. An ion exchanger as claimed in claims 2 in which the cation exchange resin particles and the anion exchange resin particles are bound by a polymer binder to form a cohesive bed.

4. A method of producing a porous and permeable ion exchanger as claimed in claim 3, die cutting a plurality of shaped clusters of cation exchange resin particles or anion exchange resin particles from a first sheet of said resin particles to form a continuous phase of said ion exchange resin particles having a plurality of holes therein, die cutting a plurality of identical clusters of the other of cation exchange resin particles or anion resin particles from a second sheet of said resin particles, and fitting said cut-out clusters of the other of the cation exchange resin particles or anion resin particles into the holes of the first sheet.

5. An ion exchanger as claimed in claim 1 in which the clusters are shallow cylinders or ellipses.

6. An ion exchanger as claimed in claim 1 in which the clusters are elongated cylinders or ellipses.

7. An ion exchanger as claimed in claim 1 in which the clusters are transversely multi-faceted.

8. An ion exchanger as claimed in claim 1 in which the clusters have a right cylinder, right rectangle, right hexagonal or right multi-faceted prismatic shape.

9. An ion exchanger as claimed in claim 1 in which at least one of said dispersed phase clusters or the continuous phase have embedded therein one or more shaped mesh preforms having a mesh size smaller than the average size of the resin particles, said preforms having a right cylinder, right rectangles right hexagonal or right multi-faceted prismatic shape.

10. An ion exchanger as claimed in claim 1 in which at least one of said dispersed phase clusters or the continuous phase have embedded therein a honeycomb mesh having a mesh size smaller than the average size of the resin particles.

11. An ion exchanger as claimed in claim 10 in which said honeycomb mesh has a cell width smaller than the width or diameter of the dispersed phase clusters.

12. An apparatus for demineralizing an aqueous liquid comprising a demineralizing compartment having a cation exchange membrane on one side of the compartment and an anion exchange membrane on the other side of the compartment and a porous and permeable bed of a continuous phase of one of cation exchange resin particles or anion exchange resin particles and a porous and permeable dispersed phase of clusters of the other of the cation exchange resin particles or the anion exchange resin particles within the continuous phase as claimed in claim, said bed filling said compartment.

13. An apparatus for demineralizing an aqueous liquid comprising an anode compartment having an anode and a cathode compartment having a cathode, and a plurality of cation exchange membranes and anion exchange membranes which are alternately arranged between the anode compartment and the cathode compartment to form demineralizing compartments each defined by an anion exchange membrane on the anode side and by a cation exchange membrane on the cathode side, and concentrating compartments each defined by a cation exchange membrane on the anode side and by an anion exchange membrane on the cathode side, and a porous and permeable ion exchanger as claimed in claim 1 filling said demineralizing compartments.

14. A method as claimed in claim 12 or 13, comprising the additional step of locating a plurality of shaped mesh preforms having a mesh size smaller than the average size of the resin particles in the receiving area defining the continuous phase of the ion exchange resin particles.

15. A method as claimed in claim 14, comprising the additional step of freezing said ion exchanger for transport.

16. A method for demineralizing water in an apparatus including an anode and a cathode compartment having a cathode, and a plurality of cation exchange membranes and anion exchange membranes which are alternately arranged between the anode compartment and the cathode compartment to form demineralizing compartments each defined by an anion exchange membrane on the anode side and by a cation exchange membrane on the cathode side, and concentrating compartments each defined by a cation exchange membrane on the anode side and by an anion exchange membrane on the cathode side, and a porous and permeable ion exchanger as claimed in claim 1 filling said demineralizing compartments, comprising feeding water to be demineralized to said demineralizing compartments, flowing an electrical current between the cathode and the anode, and removing demineralized water from the apparatus.

17. A method of producing a porous and permeable ion exchanger as claimed in claim 1, which comprises positioning a template having a planar cover plate with a plurality of shaped, thin-walled hollow elements having open top and bottom ends depending downwardly therefrom over a designated receiving area, and feeding an aqueous slurry of one of cation exchange resin particles or anion exchange resin particles to said template to form a continuous phase of said ion exchange resin particles, and feeding an aqueous slurry of the other of the cation exchange resin particles or anion exchange resin particles into the plurality of shaped, thin-walled hollow elements to form a plurality of dispersed phase clusters of the other of the cation exchange resin particles or the anion exchange resin particles.

18. A method as claimed in claim 17, comprising the additional step of inserting a shaped mesh preform having a mesh size smaller than the particles size into the hollow elements.

19. A method as claimed in claim 18, comprising the additional step of freezing said ion exchanger for transport.

20. A method of producing a porous and permeable ion exchanger as claimed in claim 1, which comprises positioning an array of dispensing nozzles for selectively dispensing an aqueous slurry of cation exchange resin particles or anion exchange resin particles over a designated receiving area, and feeding to said designated area an aqueous slurry of one of the cation exchange resin particles or the anion exchange resin particles to form a continuous phase of said ion exchange resin particles, and feeding an aqueous slurry of the other of the cation exchange resin particles or anion exchange resin particles in a predetermined pattern to form a plurality of dispersed discontinuous phase clusters of the other of the cation exchange resin particles or the anion exchange resin particles.

21. A method as claimed in claim 20, comprising the additional step of locating a shaped mesh preform having a mesh size smaller than the average size of the resin particles at the discrete discontinuous phase clusters.

22. A method as claimed in claim 21, comprising the additional step of freezing said ion exchanger for transport.

23. A method as claimed in claim 18 or 22, comprising the additional step of said shaped preform having a right cylinder, or right rectangle, right hexagonal or right multi-faceted prismatic shape.

24. A method as claimed in claim 23, comprising the additional step of said shaped preform having a right cylinder, or right rectangle, right hexagonal or right multi-faceted prismatic shape.

25. A method as claimed in claim 24, comprising the additional step of freezing said ion exchanger for transport.

26. A method as claimed in claim 23, comprising the additional step of freezing said ion exchanger for transport.

27. A method as claimed in claim 17 or 20, comprising the additional step of forming said ion exchanger over an ion exchange membrane for intimate contact of the dispersed phase of ion exchange particles with the membrane.

28. A method as claimed in claim 17 or 20, comprising the additional step of forming the ion exchanger in a spacer frame.

29. A method as claimed in claim 28, comprising the additional step of freezing said ion exchanger in the spacer frame.

30. A method as claimed in claim 17 or 20, comprising the additional step of forming the ion exchanger in a jig over a film of supporting plastic for transfer to a spacer frame.

31. A method as claimed in claim 30, comprising the additional step of freezing said ion exchanger in the jig for transfer of the ion exchanger to a spacer frame.

32. A method as claimed in claim 17 or 20, comprising the additional step of selectively providing a honeycomb mesh in the receiving area for incorporation in at least one of the dispersed phase clusters or the continuous phase.

33. A method as claimed in claim 32, comprising the additional step of freezing said ion exchanger for transport.

* * * * *